UNITED STATES PATENT OFFICE.

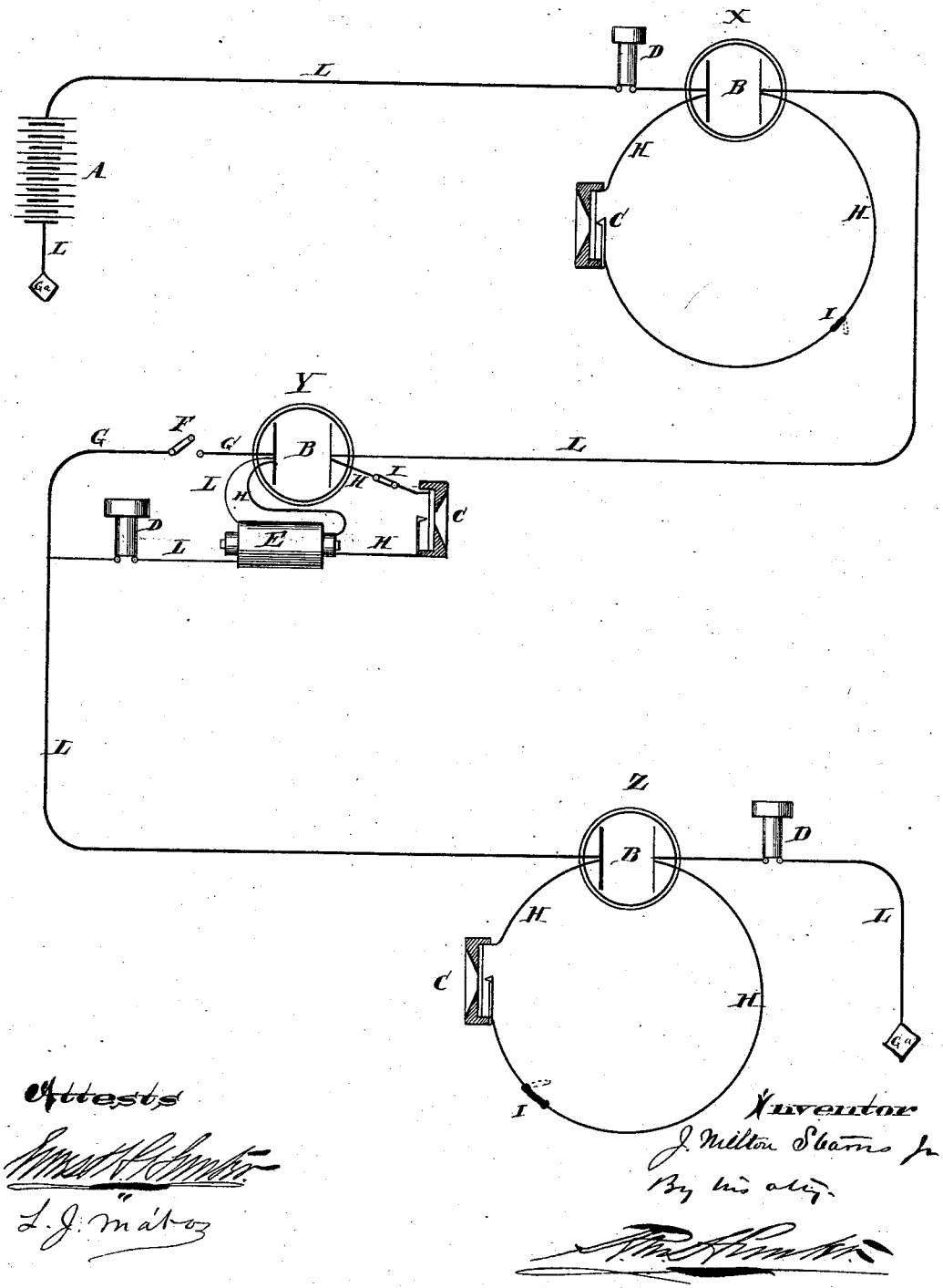

J. MILTON STEARNS, JR., OF BROOKLYN, NEW YORK.

TELEPHONE-CIRCUIT.

SPECIFICATION forming part of Letters Patent No. 281,413, dated July 17, 1883.

Application filed June 30, 1882. (No model.)

*To all whom it may concern:*

Be it known that I, J. MILTON STEARNS, Jr., of Brooklyn, in the county of Kings and State of New York, have invented an Improvement in Telephone-Circuits, of which the following is a specification.

My invention relates to an improved system for telephonic transmission; and it consists in providing one end of the line with a main or line battery or electric-current generator and each station on said line with a local secondary battery in circuit with the line and with a transmitter through the agency of a local circuit which may be in circuit with a primary wire of an induction-coil, the secondary wire of the same being in circuit with the line and one pole of the secondary battery; further, in providing the line with a switch or key whereby the line-current may be directed from the secondary battery to the line, and thus caused to pass over a circuit of low resistance, thereby practically short-circuiting the high-resistance secondary coil of the induction-coil; further, in arranging said main battery and secondary batteries in the same circuit.

The object of this invention is to arrange a secondary battery at each local station, through which a current is always passing, decomposing the substance or compound designed to play the part of the reagent in the generation of electricity in said local secondary battery when the local circuit is closed, and when said circuit is closed, through the agency of the switch, the decomposed substance recombines, producing an electrical current which shall modify the continuous line-current, causing it to operate the receiver at a distant station, whereby said local battery will never wear out or require watching.

In the drawing is shown a plan view of a main line, line-battery, and their local stations, with their apparatus, as constructed and arranged for adaptation to my improved system.

A is the main or line battery, and is located at one end of the line L, with one pole to the ground. The other pole of said battery is connected to one pole of the secondary local battery B at station X, the other pole of which secondary battery is connected to the line L. A local circuit, H, connects both poles of said secondary battery through the transmitter C, said circuit always being open except when the transmitter is being operated, when it may be closed by any suitable means. The receiver D is in circuit with the line L, as shown. All of the other stations are similarly arranged, except when an induction-coil is used, in which case some slight modifications are made. Station Y shows an arrangement with an induction-coil, E. In this case the line L is connected to one pole of the local secondary battery through the secondary wire of induction-coil E, and the local circuit H passes through the primary wire of induction-coil E. I also have a short wire, G, provided with a switch, F, between the line-wire L, on one side of the induction-coil E, and the battery B, as shown, to short-circuit said induction apparatus by allowing the greater portion of the current to pass directly over line G. The local circuit H may be opened by means of switch I.

Station Z is arranged similarly to station X, with the exception of the main battery A, which may be arranged at said station X or beyond it.

The local batteries B are what are commonly known as "secondary batteries," and may be made in various ways—as, for instance, two plates of lead immersed in sulphuric acid and water, lead-plate porous cup containing carbon and nitrate of potash, &c. In the first of these instances the passage of a current through the battery (if it might be so called) causes the lead at one pole to become peroxidized, and upon completing a short circuit through said plates a strong current is obtained; and in the second instance the nitrate of potash is decomposed, the nitrate acid goes to the porous cup, and the potash remains with the lead, and upon making a short circuit through the carbon and lead a powerful current is obtained.

The operation is as follows: A current, being generated by the main battery A or by a dynamo-electric machine, passes down the line L and through the secondary batteries B, and finally to the ground. This current causes reactions to take place in the secondary batteries, as set forth above, placing said secondary batteries in proper condition to generate powerful currents. At station X or Z, if circuit H is closed by switch I, the transmitter is included in a branch of the circuit of the secondary battery, and also in a branch of the main circuit. If the diaphragm of the transmitter is now caused to vibrate by sounds uttered against the same, the resistance of circuit will be varied in accordance with the sound-vibrations, and will short-circuit more or less of the current upon the line, and thereby operate the receivers included in the line. At station Y the operation is somewhat more complex. Switch I must be closed and switch F opened. In addition to what happens at stations X and Z, there will be alternating induced currents generated in the secondary of the induction-coil, and it will depend upon the connection of the terminals of the secondary coil with the line whether the induced currents will conspire with or antagonize the effects of the undulatory battery-currents upon the line. The arrangement may be so that the currents will conspire, and in this case there will be an improved telephonic effect.

This form of apparatus is particularly good where two or more subscribers are on one line or wire, for there is no care necessary in maintaining at each station a local battery, which, from inattention is liable to run down. This combination of a secondary-battery cell with a local circuit and line with its main battery or electric generator may be also used for telegraphic purposes.

In this application I do not claim, broadly, the adaptation of secondary batteries to telephone-lines, as that forms subject-matter of a patent granted to me January 9, 1883, and numbered 270,500.

Having now described my invention, what I claim as new, and desire to secure by Letters Patent, is—

1. A line-wire provided at one end with a line-battery or electric-current generator, in combination with a secondary cell arranged upon said line and adapted to become charged upon the passage of the main current through it, an induction-coil arranged in said line, with its secondary wire to line and secondary battery, a shunt around the secondary of the induction-coil and a switch in said shunt, a local circuit including the secondary battery, the coarse or primary wire of the induction-coil, and transmitter, substantially as and for the purpose specified.

2. A telephone-station apparatus provided with a receiver, an induction-coil having its secondary circuit arranged in connection with said receiver and a main line, a secondary electric pile or battery arranged in connection with a main line in a manner to be charged by an electric current passing over said main line, a transmitter, a local circuit including the transmitter, battery, and primary of the induction-coil, and means for directing the current of said secondary electric pile or battery over the primary circuit of the induction-coil and transmitter.

3. A line-circuit provided with a main battery at one place thereon, in combination with a secondary battery or electric pile arranged to be charged by the current in the main line, an induction-coil, a local circuit through said secondary battery and primary wire of induction-coil, a transmitter in said local circuit, a shunt around the secondary of the induction-coil, and a switch in said shunt to throw all of the line-current through the secondary wire of said induction-coil.

In testimony of which invention I hereunto set my hand.

J. MILTON STEARNS, JR.

Witnesses:
GEORGE SPARROW,
JOHN M. STEARNS.